US008880547B1

(12) United States Patent
Mills et al.

(10) Patent No.: US 8,880,547 B1
(45) Date of Patent: Nov. 4, 2014

(54) IMPLEMENTATION OF A SEARCH FOR ITEMS

(75) Inventors: Brent Robert Mills, Seattle, WA (US); Daniel R. Parshall, Redmond, WA (US); Blair L. Hotchkies, Bellevue, WA (US); Jason P. Patrikios, Seattle, WA (US); Paul Daniel Jaye, Seattle, WA (US); Dan Catalin Teodorescu, Shoreline, WA (US); Jennica Jane Pounds, Bothell, WA (US); Luis Alejandro Acosta, Seattle, WA (US); David Aaron Lichterman, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 836 days.

(21) Appl. No.: 12/506,301

(22) Filed: Jul. 21, 2009

(51) Int. Cl.
*G06F 17/30* (2006.01)

(52) U.S. Cl.
USPC .......................................... 707/767; 707/768

(58) Field of Classification Search
USPC ................................................ 707/767, 768
See application file for complete search history.

(56) References Cited

U.S. PATENT DOCUMENTS

| 7,716,199 B2* | 5/2010 | Guha .......................... 707/706 |
| 7,890,516 B2* | 2/2011 | Zarzar Charur et al. ...... 707/751 |
| 7,953,730 B1* | 5/2011 | Bleckner et al. .............. 707/722 |
| 2007/0038615 A1* | 2/2007 | Vadon et al. ...................... 707/4 |
| 2007/0239671 A1* | 10/2007 | Whitman et al. .................. 707/2 |
| 2007/0282811 A1* | 12/2007 | Musgrove .......................... 707/3 |
| 2009/0106241 A1* | 4/2009 | Blackwell ......................... 707/5 |
| 2009/0241044 A1* | 9/2009 | Costello ......................... 715/764 |
| 2009/0248669 A1* | 10/2009 | Shetti et al. ....................... 707/5 |
| 2009/0259624 A1* | 10/2009 | DeMaris et al. ................... 707/3 |
| 2011/0106831 A1* | 5/2011 | Zarzar Charur et al. ...... 707/767 |

* cited by examiner

*Primary Examiner* — Etienne Leroux
*Assistant Examiner* — Cindy Nguyen
(74) *Attorney, Agent, or Firm* — Thomas | Horstemeyer, LLP

(57) ABSTRACT

Disclosed are various embodiments for generating search results when a search string fails to return results as entered. In a representative example, a failure of a first query generated from a search string to identify at least a predefined threshold number of items from among a plurality of items in a data store is detected in a computing device. A plurality of altered versions of the search string is generated in the computing device. A submission of a plurality of second queries to the data store is implemented, where each of the second queries corresponds to one of the altered versions of the search string. A presentation is generated to be rendered of at least two separate groups of items resulting from corresponding ones of the second queries.

25 Claims, 4 Drawing Sheets

IMPLEMENTATION OF A SEARCH FOR ITEMS

BACKGROUND

Merchant websites may provide customers with the ability to identify a product to purchase by using a word search. Unfortunately, it can happen that a customer may enter a word search that has too many terms. In such cases, a merchant website may indicate that no products match the search due to the fact that the search was overly constrained.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 2 is a drawing of one example of a user interface generated by a device in the data communications network of FIG. 1 according to an embodiment of the present disclosure.

DETAILED DESCRIPTION

The following discussion describes systems and methods relating to the enhancement of word searching using a search string in the context of an online marketplace or any other search context according to various embodiments. In one embodiment, a customer may enter a search string in order to search for one or more products sold through the network presence of online merchants. For the sake of convenience, first a data communications network 100 is described, followed by a discussion of the operation of the various components of the data communications network 100 according to various embodiments.

Figure 1:
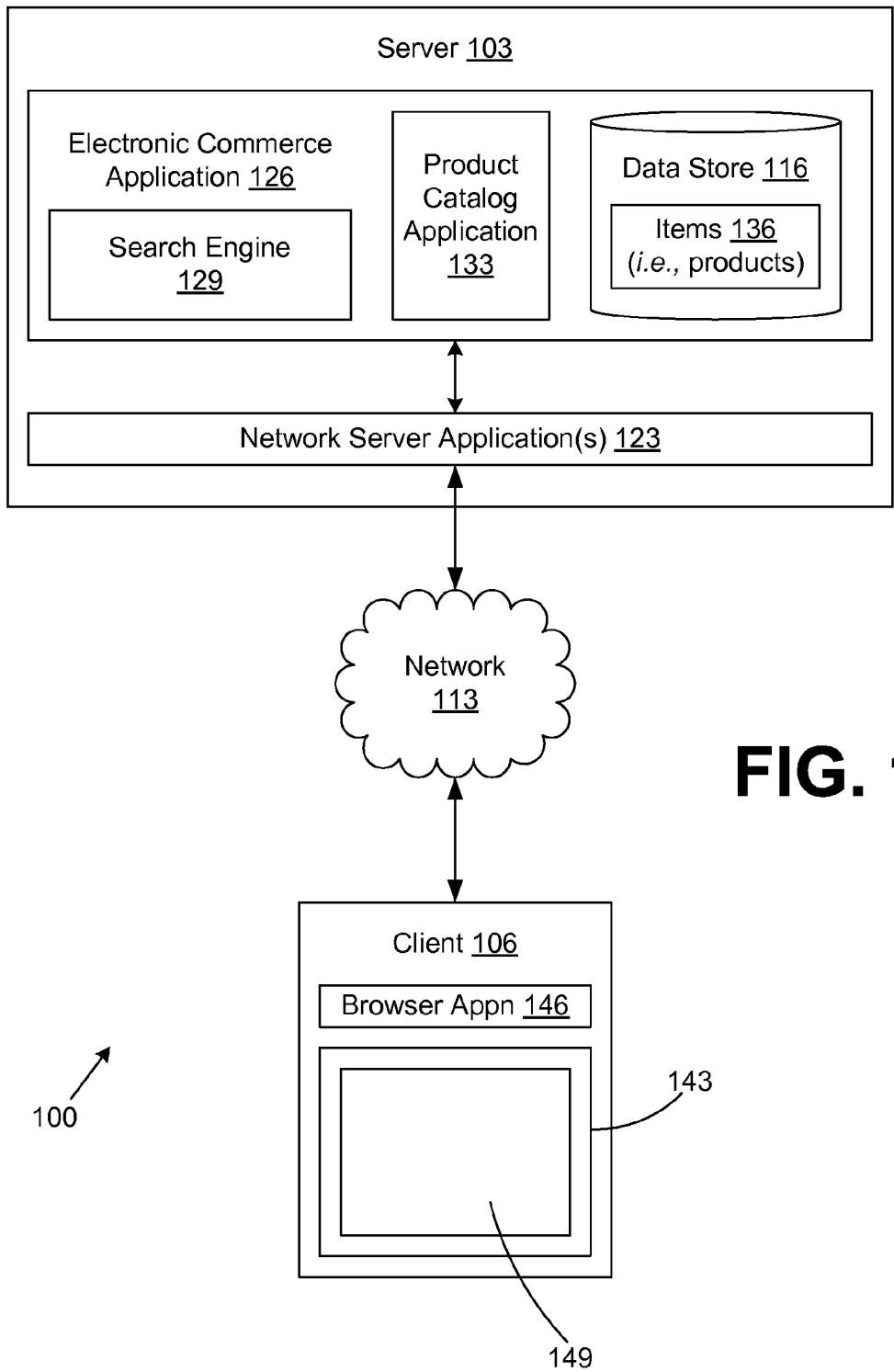
FIG. 1 is a drawing of one example of a data communications network according to an embodiment of the present disclosure.

With reference to FIG. 1, shown is an example of a data communications network 100 that includes various computing devices such as one or more servers 103 and one or more clients 106 that are coupled to a network 113. The network 113 may comprise, for example, the Internet, intranets, extranets, wide area networks (WANs), local area networks (LANs), wired networks, wireless networks, or other suitable networks, etc., or any combination of two or more such networks. For purposes of convenience, the one or more servers 103 and the one or more clients 106 are referred to herein in the singular. However, it is understood that in one embodiment, the server 103 may represent a plurality of servers, and the client 106 may represent a plurality of clients.

The server 103 comprises one example of a computing device that may be employed to execute various components as described herein. The server 103 may comprise, for example, a server computer or like system. The server 103 may represent multiple servers arranged, for example, in one or more server banks or other arrangements. Such servers 103 may be located in a single installation or may be dispersed among many different geographical locations. To this end, the server 103 may be viewed as a server "cloud" that represents the computing capacity of multiple servers, etc.

Various applications and/or engines are executed in the server 103 according to various embodiments. Also, various data may be stored in a data store 116 that is accessible to the server 103. The data stored in the data store 116 may be associated with the operation of the various applications and/or engines described below. The applications executed on the server 103 include a network server application 123, an electronic commerce application 126, and potentially other applications.

The network server application 123 may comprise, for example, web servers or other types of network server applications 123 that provide browser access or other appropriate types of access to content and applications in the server 103 to clients 106 and the like using various protocols such as the transmission control protocol/Internet Protocol (TCP/IP). To this end, the network server application 123 may comprise multiple component applications as can be appreciated.

The electronic commerce application 126 facilitates the network presence of one or more online merchants. To this end, the electronic commerce application 126 may comprise one or more component applications and/or engines. Such components may comprise, for example, a search engine 129, a product catalog application 133, and other components. Such components may be implemented on a plurality of servers 103 that are located at one site, or are distributed among geographically diverse sites as can be appreciated. The search engine 129 is configured to submit queries to the product catalog application 133. The product catalog application 133 is configured to search items 136 in the data store 116 based upon a query. Such items 136 may comprise, for example, products such as goods and/or services or other items. The data store 116 may be centrally located or the data store 116 may be distributed among multiple sites as can be appreciated.

It should be understood that searches performed to identify desired items 136 such as products for purchase provides one example environment of the present disclosure and that searches may be performed on other subject matter using the various principles described herein.

The client 106 is representative of a plurality of client devices that may be coupled to the network 113. For example, the client 106 may comprise one of millions of clients 106 coupled to the Internet. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may include, for example various peripheral devices. In particular, the peripheral devices may include input devices such as, for example, a keyboard, keypad, touch pad, touch screen, microphone, scanner, mouse, joystick, or one or more push buttons, etc. The peripheral devices may also include a display device 143, indicator lights, speakers, etc. The display device 143 may comprise, for example, cathode ray tubes (CRTs), liquid crystal display (LCD) screens, gas plasma-based flat panel displays, LCD projectors, or other types of display devices, etc.

Executed within the client 106 are various applications including a browser application 146. The client browser application 146 is configured to interact with the electronic commerce applications 126 and potentially other applications on the server 103 through the network server application 123 according to an appropriate protocol such as the Internet Protocol Suite comprising Transmission Control Protocol/Internet Protocol (TCP/IP) or other protocols. To this end, the browser application 146 may comprise, for example, a commercially available browser such as INTERNET EXPLORER® sold by Microsoft Corporation of Redmond, Wash., or MOZILLA FIREFOX® which is promulgated by Mozilla Corporation of Mountain View, Calif., or other type of browser. Alternatively, the browser application 146 may comprise some other application with like capability. When executed in the client 106, the browser application 146 renders network pages 149 or other types of user interfaces on the display device 143 or other rendering device. In one embodiment, the network page 149 comprise a web page or other type of content.

Next, a general discussion of the operation of the data communications network 100 is provided according to various embodiments. To begin, assume that a user manipulates the browser application 146 in the client 106 in order to search for one or more items 136 offered by an online merchant through the electronic commerce application 126. In such case, the items 136 comprise, for example, products offered for sale by the online merchant in accordance with one embodiment of the present disclosure. Alternatively, the user may be performing a search for items 136 other than products in some other context as can be appreciated.

In one embodiment, a user may enter a search string into a search text box in a network page 149 in order to initiate a search for desired items 136. To this end, some users mistakenly believe that the search text box is to be used to describe the specific item 136 in detail. Such a user may enter a long search string that tends to describe what they are looking for in detail rather than entering a strategically crafted set of keywords to facilitate an effective search for desired items 136. For example, a user who wishes to buy a hat for the beach might enter a search string that states "I am looking for a hat for the beach having yellow ribbon and a large rim for protection against the sun" or something comparable.

Such a search string may be unlikely to result in a query that will produce a meaningful group of products to review due to the fact that the search string is overly constrained as it has too many terms. In fact, it may be likely that the above search string would result in zero products in response to a corresponding query submitted to a product catalog, etc. In addition, there may be other reasons why queries generated from search strings do not return results.

In some situations, a user may get discouraged due to the fact that zero results were obtained based upon the search string that they entered. Less sophisticated users may conclude that the online merchant does not carry items 136 that were described in the search string. As a result, the user may be discouraged from making a purchase with the online merchant. This correspondingly results in numerous lost sales for online merchants.

In addition, it may be the case that various queries may be formulated from the search string that was entered by a user. Specifically, each query may be generated based upon part of the search string. The results of multiple such queries may be combined to provide a result for the search. However, the problem with such an approach is that it is possible that irrelevant items 136 may be included in a search result generated based upon part of the entire search string. That is to say, a query generated based upon part of the search string may be too broad, thereby identifying items 136 that are unrelated to the search string. If such irrelevant items 136 are displayed in the results, a user may lose faith that a search performed on the network presence of an online merchant will reveal relevant results. This too may discourage further user participation resulting in lost sales.

In accordance with various embodiments, a user may execute a browser application 146 to access a network site served up by the electronic commerce application 126. In doing so, according to one embodiment, assume that the user wishes to search through the items 136 stored in the data store 116 for one or more items 136 that they may wish to purchase. To this end, the electronic commerce application 126 may serve up one or more network pages 149 that facilitate the entry of a search string by the user. Such search strings may be entered into various components of a network page 149 that is rendered on a display device 143 of the client 106.

Alternatively, the user may enter a search string for some other purpose other than identifying items 136 for purchase. For example, the search string may be used to perform a web search or for some other purpose.

In addition, the user may enter a search string through a voice interface over a suitable voice communications system using telecommunications networks such as plain old telephone services (POTS), digital telephone networks, voice-over-IP systems, and the like.

During the course of the ordinary operation of the electronic commerce application 126, the user may submit a search string in an attempt to identify items 136 that the user wishes to purchase. The search engine 129 generates a query from the search string and submits the same to the product catalog application 133 to ultimately query the items 136 stored in the data store 116 to determine those products relevant to the search string. In response, the product catalog application 133 sends a listing of one or more items 136 that are responsive to the query. The electronic commerce application 126 then generates a network page 149 that is transmitted to the client 106 that lists the items 136 that are responsive to the search string entered by the user.

In some situations, it may be the case that few or no items 136 can be identified based upon the search string. According to various embodiments, a search engine 129 is provided that detects when a query that is generated from a search string fails to identify at least a predefined threshold number of items 136 from those stored in the data store 116. The predefined threshold number may be specified based upon the nature of the searching function performed. For example, in one embodiment, a threshold of 10 items may be specified, although it may be any number as can be appreciated.

When the search engine 129 detects that a query generated from a search string failed to identify one or more items 136 from those stored in the data store 116, the search engine 129 is configured to generate one or more altered versions of the search string by making various modifications to the search string. For each altered version of the search string, a query is submitted to the product catalog application 123 so as to query the items 136 in the data store 116. Such queries are identified herein as "second queries." Assuming that at least one of the second queries identifies at least one item 136 from the data store 116, then the electronic commerce application 126 proceeds to generate a network page 149 that comprises a presentation of the items 136 identified in the respective second queries submitted to the data store 116.

According to one embodiment, the presentation of the network page 149 may show two or more separate groups of items 136 that result from corresponding ones of the second queries. Associated within the presentation of each respective group of items 136 is the total number of items 136 in the group. The network page 149 is generated so as to be rendered on a rendering device such as the display device 143 of the client 106 or other rendering device. Alternatively, such other rendering devices may comprise, for example, printers or other devices.

According to various embodiments, each group of items 136 displayed in a respective network page 149 allows a user to select a respective one of the groups as most relevant to the search originally performed by entering the original search string. Thus, the display of multiple groups of items 136 corresponding to multiple variations of the original search string entered by the user advantageously informs the user that the original search string revealed no results. At the same time, the display of multiple groups of items 136 increases the possibility that at least one of the groups displayed may have high relevance to the subject matter of the original search string.

To this end, a user who may be less sophisticated and does not appreciate that a search string can be too narrow is thus informed that the search string entered was problematic. At the same time, the user is still presented with viable results. Also, given that one of the different groups of items 136 that result from the respective second queries may not be relevant to the original search string due to the alteration made to the original search string, a user may not select such a group where other groups appear to be more relevant. This prevents a user from believing that the search function itself is random in nature and a waste of time.

In addition, the resulting network page 149 presents the respective groups of items 136 identified in response to the second queries in a manner that facilitates the selection of a respective one of the groups of items 136 to be rendered in a separate network page 149 apart from the other groups of items 136. Accordingly, a user may select the particular group of items 136 that is most relevant to the search that they had attempted to perform.

To generate the altered versions of the search string entered by a user, the search engine 129 may perform various functions with respect to the search string. Alternatively, the same functions may be performed on the original search string as the preconditioning or treatment of the original search string before a corresponding query is submitted to the product catalog application 133 as will be described.

The various types of actions that may be taken to condition or otherwise alter a search string may comprise, for example, removing one or more terms from the search string, or eliminating duplicate terms from the search string. Still further, the search engine 129 may be configured to apply a weight to each of the terms in a search string based upon a frequency data that indicates the frequency of use of such terms in searching or other frequency of use as can be appreciated. Such frequency data may be obtained from various sources. Also, two or more terms within a given search string may be recognized as a literal phrase to be employed within a query, where the literal phrase may be treated like a single term as described herein. Thereafter, search terms may be eliminated from the search string based upon the weights assigned.

For example, one or more of the terms having the smallest or largest weights may be eliminated from the search string as can be appreciated. The terms may be removed from the search string in any order such as, for example, from left to right, right to left, at random, or via some other order as can be appreciated. For example, it may be determined that a higher weight indicates a greater frequency of usage, thereby indicating that such term may be of greater importance in a corresponding search. Accordingly, such term may be afforded a high weight that prevents such term from being eliminated from the search string before being applied as a query to the items 136 in the data store 116.

In addition, the search engine 129 may perform a spell correction on one or more of the terms in the search string, or may perform other actions with respect to the search string in either generating the first query based upon the search string, or on second queries based on altered versions of the search string. In one example, the search engine 129 may remove so-called "stop words" or other terms that are commonly known to have little relevance to a search. Such terms may comprise, for example, terms such as "a," "in," or other terms as can be appreciated.

As was mentioned above, where two or more terms are recognized as a literal phrase, such two or more terms may be treated as a single term even though there are two or more terms in the phrase. Thus, a search term as understood herein may comprise a single term or a literal phrase taken as a single term.

Figure 2:
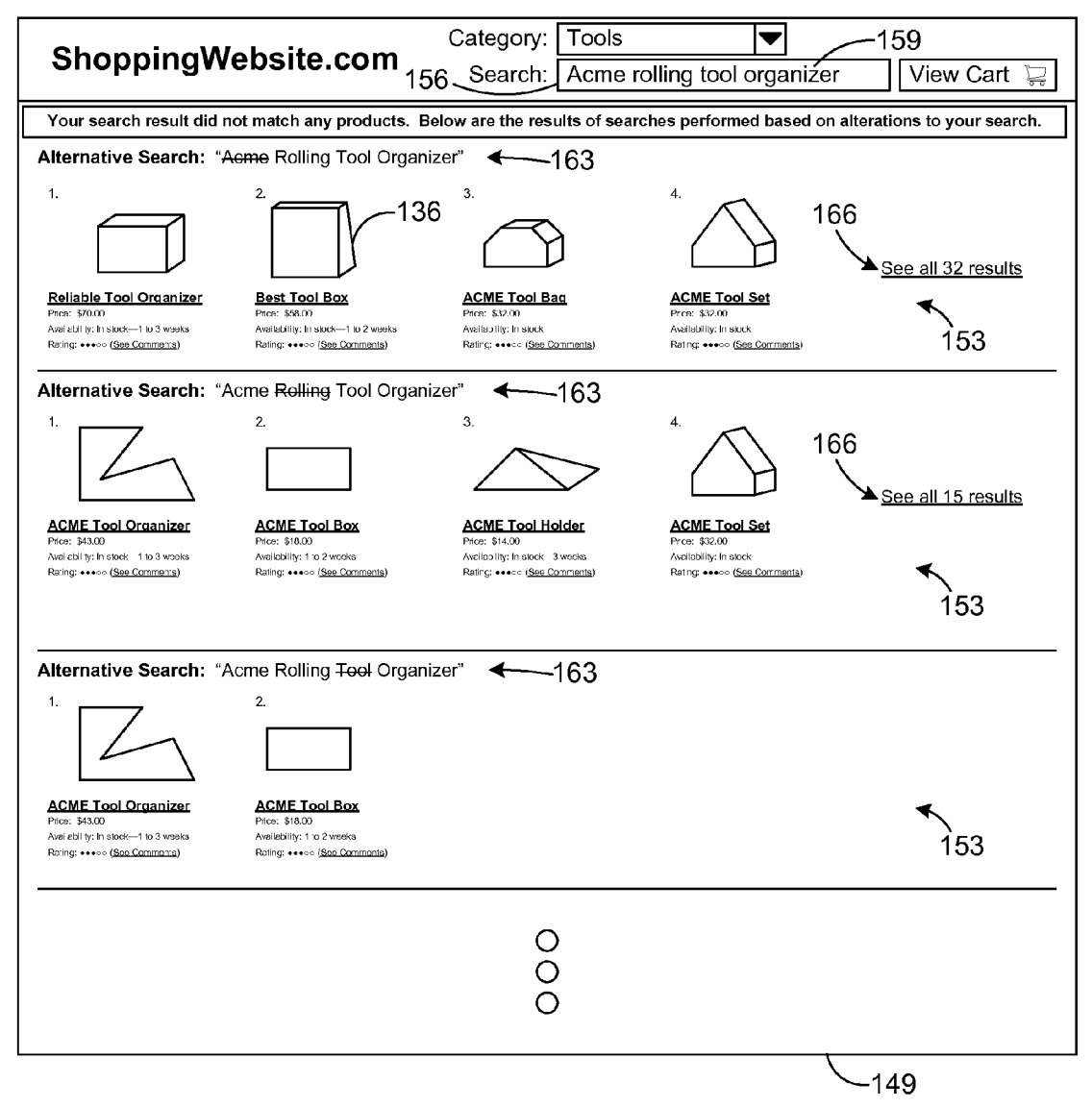

With reference to FIG. 2, shown is one example of a network page 149 that is generated by the electronic commerce application 126 in accordance with the various embodiments. In one embodiment, the network page 149 is served up to the client 106 (FIG. 1) and displayed on the display device 143 (FIG. 1) or is rendered in some other manner as can be appreciated. The network page 149 displays separate groups 153 of items 136 taken from the data store 116 (FIG. 1). Each of the groups 153 is presented separately from the other ones of the groups 153.

The network page 149 also includes a search text box 156 in which a search string 159 appears. The search string 159 is entered by a user in order to provide the parameters by which a search of the items 136 can be performed to identify those items 136 that the user wished to view or purchase. According to one embodiment, the search string 159 does not provide any results for a search performed among the items 136 in the data store 116. Such an occurrence may be due to the fact that, for example, the search string 159 is too long, making it too narrow in scope. Therefore, according to the various embodiments, the search engine 129 generates a plurality of altered versions of the search string 159 that are displayed as altered search strings 163 in the network page 149. That is to say that each altered search string 163 comprises an altered version of the search string 159 originally entered by a user. Each altered search string 163 is graphically associated with a group 153 of items 136 identified based upon a second query generated from the altered search string 163 itself.

To the extent that all of the items 136 in a given group 153 do not fit within a single horizontal row in the network page 149, then a link 166 is associated with the respective group 153 that may be manipulated by the user in order to view a subsequent network page 149 that includes all of the results for the respective group 153 that are presented apart from the other groups 153 of items 136. In addition, each altered search string 163 may be presented as a link that may be clicked upon to facilitate a selection of such group 153 to be presented in a separate network page 149 apart from other groups 153 of items 136. The link 166 sets forth a total number of the items 136 in a respective group 153.

According to one embodiment, a limited number of groups 153 are selected to be displayed as part of the network page 149. For example, the number of groups 153 of items 136 generated depends upon the number of different altered search strings 163 that are generated from the search string 159. In one embodiment, all groups 153 having at least one item 136 that were identified based upon a respective altered search string 163 are presented as part of the network page 149. To this end, a scrolling mechanism may be employed in cases where all of the groups 153 presented do not fit within a single screen or other rendering. Alternatively, a limited number of the possible groups 153 may be presented in the network page 149 based upon predefined criteria. For example, it may be the case that a limited number of the groups 153 are included in the network page 149 having the most items 136 associated therewith. For example, it may be desirable to present the top four or five groups 153 having the most items 136. Alternatively, some other criteria may be used to identify the groups 153 to be rendered.

The groups 153 may be presented in the network page 149 according to a predefined order or priority. Such priority may be determined based upon any one of a number of factors such as, for example, the number of items 136 within a given group 153, the prices associated with the groups 153, the availability of items 136 within the groups 153, or other factors as can be appreciated.

The fact that the items 136 are displayed in the network page 149 in separate groups 153 along with the associated altered search strings 163 allows a user to see how other permutations of the original search string 159 they entered may pull up groups 153 of items 136 when the original search string 159 revealed no results. As a consequence, a user is disabused of the belief that the particular online merchant does not carry products relevant to their search. Also, given that the altered search strings 163 are displayed in association with respective groups 153 of items 136, a user can see how the alteration made to the respective altered search string 163 may have resulted in items 136 listed in a group 153 that are not particularly relevant to the search string 159 that was entered.

Accordingly, the user advantageously receives results to a search even though the search string 159 that they entered would result in no identified items 136 from a corresponding search. Further, the network page 149 serves to educate users as to how to enter search strings 159 as they can compare and contrast the search string 159 they entered into a search text box 156 with the altered search strings 163 shown in the network page 149 relative to the number of items 136 that were identified for such altered search strings 153.

Figure 3:
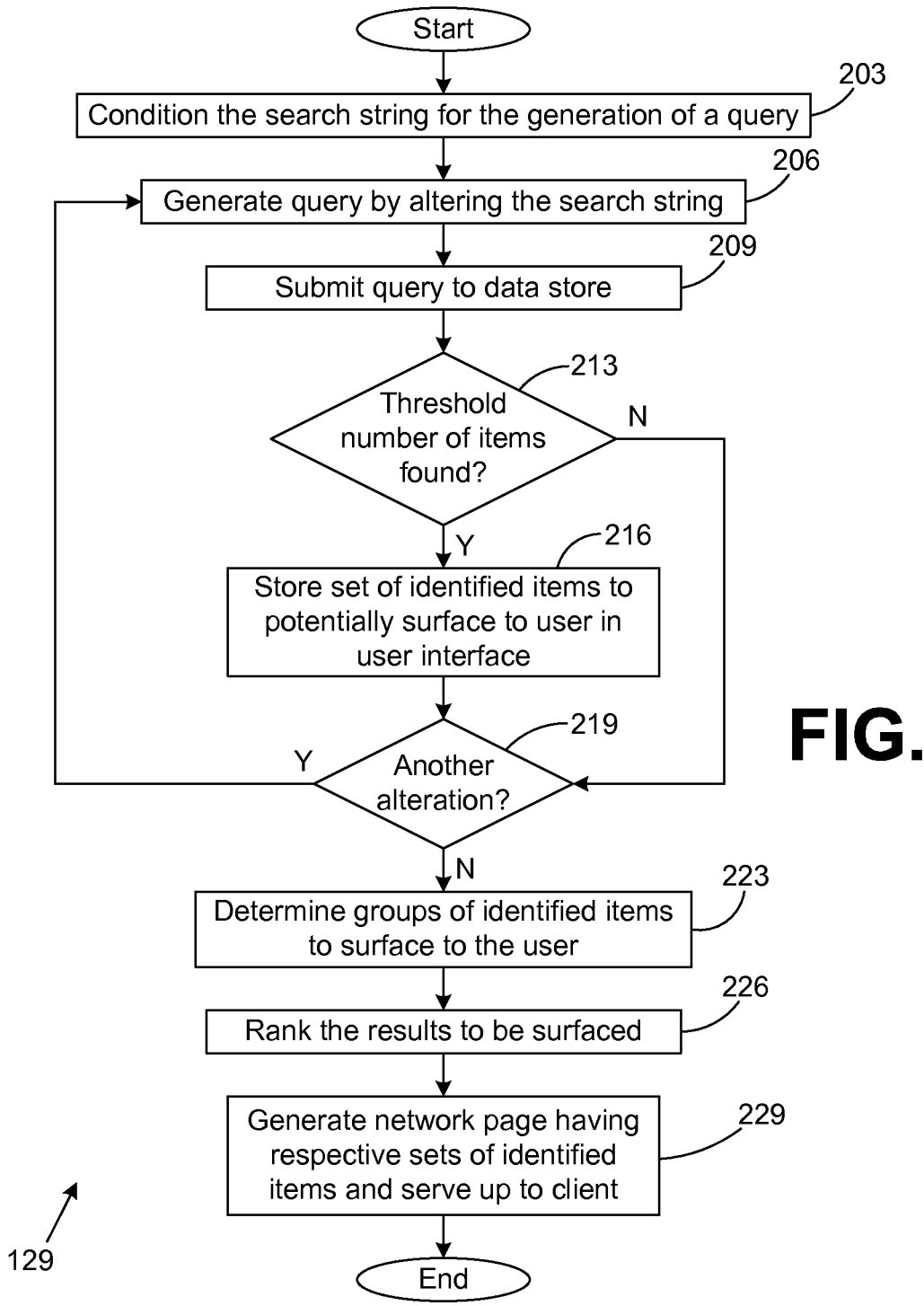
FIG. 3 is a flowchart that provides one example of functionality implemented in a computing device in the data communications network of FIG. 1 according to an embodiment of the present disclosure.

With reference to FIG. 3, shown is one example of a flowchart that illustrates one example of functionality of the search engine 129 according to various embodiments. The functionality of FIG. 3 may be implemented when it is detected that a first query generated from a search string 159 (FIG. 2) entered by a user failed to identify at least one item 136 (FIG. 1) from among all of the items 136 in the data store 116 (FIG. 1) that match the query. To this end, such a query may be too narrow in scope such that it includes too many search terms or may have other problems as can be appreciated.

To begin, in box 203, the search engine 129 conditions the search string 159 for the generation of subsequent queries. To this end, various actions may be taken with respect to the search string 159 such as, for example, applying spell correction to any terms misspelled in the search string 159. Also, unsearchable words may be eliminated from the search string 159 such as "a," "and," or other like terms. Further, the search string 159 may be conditioned by removing any duplicate words within the search string 159 or by applying phrase recognition to tie two or more words together in a literal phrase to be searched. In addition, other conditioning steps may be taken to better position the search string 159 for the generation of appropriate queries.

The search string 159 that was entered by the user may be conditioned before a corresponding query is generated in an initial determination as to whether any items 136 can be identified. When the search engine 129 detects that there are no results for a query generated based upon the original search string 159, then the functionality as depicted in FIG. 3 may be implemented where box 203 is skipped over if the search string 159 has been conditioned prior to the original search.

Next, in box 206 the search string 159 is altered and a corresponding query is generated to be submitted to the data store 116 by the product catalog application 133 (FIG. 1). Such an alteration may comprise, for example, removing one or more terms from the search string 159. The terms may be removed in any order such as from left to right, right to left, at random, or based upon some other scheme. Also, the terms within a search string 159 may be weighted according to the frequency of use of such terms. Thereafter, the terms may be removed based upon the weights assigned. For example, the terms may be removed according to the weights assigned starting with the lowest to the highest. Note that for each alteration, only a single term may be eliminated initially until all terms have been removed. Thereafter, combinations of two or more terms may be removed for further alterations. In addition, other alterations may be performed such as spell correction, literal phrase recognition, removal of stop terms, and any other alterations as described above. In some cases such alterations may have been made when pre-conditioning the search string 159.

Then, in box 209, the query is submitted to the data store 116 through the product catalog application 133. In box 213, if at least a predefined threshold number of items 136 are found responsive to the query, then the search engine 129 proceeds to box 216. Otherwise, the search engine 129 progresses to box 219. In one embodiment, the predefined threshold number of items 136 may be 1, 5, 10, or any other threshold number that is deemed appropriate. In one embodiment, the predefined threshold number is specified based upon the number of items that would be considered sparse relative to the type of search function performed and a generally expected number of results by users.

In box 216, the set of identified items 136 are stored to potentially surface to the user in an appropriate network page 149 or other user interface as described above. Thereafter, in box 219, the search engine 129 determines whether another alteration of the search string 159 is to be made. If so, then the search engine 129 reverts back to box 206. Note that a limited number of alterations to the search string 159 may be made based upon a predefined limit or some other criteria. For example, the number of alterations made to the search string 159 may depend upon the total number of possible alterations that can be made to the search string 159.

Assuming that there are no further alterations to be made to the search string 159 as determined in box 219, then in box 223 the search engine 129 determines which of the groups 153 (FIG. 2) of items 136 identified are to be surfaced to a user in the form of a network page 149 or other user interface. In one embodiment, a network page 149 may accommodate a limited number of groups 153, where the total number of groups 153 may be limited to a predefined number. Alternatively, all of the groups 153 may be included within a network page 149 where scrolling or other techniques are used to show the various groups 153 if they do not fit within one display or other rendering. Still further, only groups 153 that include a predefined minimum number of items 136 may be included in a network page 149. Alternatively, other approaches may be employed to determine those groups 153 that are to be surfaced to a user.

In box 226, any of the groups 153 that are to be surfaced to the user in a network page 149 or other user interface are ranked based on predefined criteria. For example, in one embodiment, the groups 153 may be ranked according to the total number of items 136 in the group 153, where the groups 153 are ranked from highest to lowest. Also, other factors may bear on the ranking of the groups 153 that are to be surfaced to a user such as, for example, availability of items 136, factors relating to the queries performed for each group 153, or other factors.

Thereafter, in box 229, a network page 149 is generated having the respective groups 153 of identified items 136. Such a network page 149 is served up to a client 106 (FIG. 1).

Figure 4:
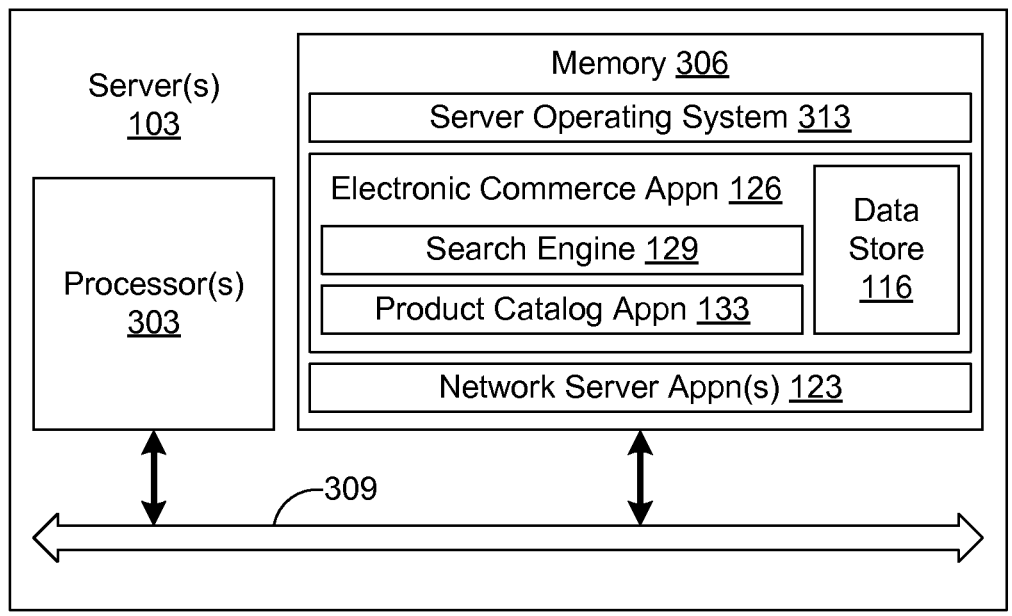
FIG. 4 is a schematic block diagram that illustrates one example of a computing device employed in the data communications network of FIG. 1 according to an embodiment of the present disclosure.

Referring next to FIG. 4 shown is a schematic block diagram of one example of the server 103 according to an embodiment of the present disclosure. The server 103 includes at least one processor circuit, for example, having a processor 303 and a memory 306, both of which are coupled to a local interface 309. To this end, the server 103 may comprise, for example, a server computer or like device. The local interface 309 may comprise, for example, a data bus with an accompanying address/control bus or other bus structure as can be appreciated.

Stored in the memory 306 are several components and/or applications that are executable by the processor 303 and data that may be employed by such components and/or applications. In particular, stored in the memory 306 and executable by the processor 303 are a server operating system 313, the electronic commerce application(s) 126, the network server application(s) 123, and potentially other applications. The electronic commerce application 126 includes, for example, the search engine 129, the product catalog application 133, and other applications/engines. Also, according to one embodiment, the data store 116 in which the items 136 (FIG. 1) are stored is associated with the electronic commerce application 126 as described above. It is understood that there may be other applications that are stored in the memory 306 and are executable by the processor 303 as can be appreciated. Also, other data may be stored in the memory 306 and accessed by the processors 303 beyond the items 136 stored in the data store 116 as described above.

A number of software components are stored in the memory 306 and are executable or executed by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 303 may represent multiple processors and the memory 306 may represent multiple memories that operate in parallel. In such a case, the local interface 309 may be an appropriate network that facilitates communication between any two of the multiple processors, between any processor and any one of the memories, or between any two of the memories etc. The local interface 309 may comprise additional systems designed to coordinate this communication, including, for example, performing load balancing. The processor 303 may be of electrical or of some other available construction.

The various applications, engines, network pages, and other components described above may be implemented using any one or more of a number of programming languages such as, for example, C, C++, C#, Visual Basic, VBScript, Java, JavaScript, Perl, Ruby, Python, Flash, Hypertext Markup Language (HTML), Extensible Markup Language (XML), or other programming languages.

Although the various applications and engines described above may be embodied in software or code executed by general purpose hardware, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flowchart of FIG. 3 shows examples of the functionality and operation of an implementation of the various applications described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications and/or engines described herein comprise software or code, each can be embodied in any computer-readable medium for use by or in connection with an instruction execution system such as, for example, a processor in a computer system or other system. In this sense, the applications and/or engines may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
    detecting when a first query generated from a search string in a computing device identifies less than a predefined threshold number of items from among a plurality of items in a data store, wherein the search string comprises a plurality of search terms;
    generating, by a search engine, upon detection, a plurality of altered versions of the search string in the computing device that are restricted to containing a subset of the plurality of search terms of the search string, by performing at least one of the following:
        removing at least one search term from the search string;
        eliminating a duplicate search term from the search string; or
        recognizing at least two terms in the search string as a literal phrase to be employed in a respective one of a plurality of second queries;
    implementing, in the computing device, a submission of the plurality of second queries to the data store, each of the second queries corresponding to a respective one of the altered versions of the search string;
    generating, in the computing device, a presentation of at least two separate groups of the items resulting from a corresponding at least two of the second queries to be rendered;
    facilitating a selection of one of the at least two separate groups of the items in the presentation to be rendered apart from other groups of items; and
    sending the presentation to a client to be rendered by the client.

2. The method of claim 1, wherein for each of the at least two separate groups of the items, the method further comprises associating a total number of the items in the group with the presentation of the group of the items.

3. The method of claim 1, wherein the search string is overly constrained, thereby resulting in a failure of the first query to identify the predefined threshold number of items from among the plurality of items in the data store.

4. A system, comprising:
    a computing device; and
    a search engine executed in the computing device, the search engine being configured to:
        detect when a first query generated from a search string identifies less than a predefined threshold number of items from among a plurality of items stored in a data store accessible to the computing device, wherein the search string comprises a plurality of search terms;
        generate, upon detection, a plurality of altered versions of the search string that are restricted to containing a subset of the plurality of search terms of the search string;
        submit a plurality of second queries to the data store, each of the second queries corresponding to a respective one of the altered versions of the search string; and
        generate a presentation of at least two separate groups of the items resulting from a corresponding at least two of the second queries to be rendered on a rendering device.

5. The system of claim 4, wherein the search engine is further configured to:
    detect when the first query generated from the search string identifies less than one of the items from among the plurality of items; and
    generate at least a one of the altered versions of the search string based on removing the at least one search term of the search string.

6. The system of claim 4, wherein the rendering device comprises one of a display device or a printer.

7. The system of claim 4, further comprising an application executed in the computing device configured to send the presentation to a client to be rendered by the client.

8. The system of claim 4, wherein the search engine is further configured to facilitate a selection of one of the at least two separate groups of the items in the presentation to be rendered apart from other groups of the items.

9. The system of claim 4, wherein the search engine generates the plurality of altered versions of the search string by removing at least one term from the search string.

10. The system of claim 4, wherein the search engine generates the plurality of altered versions of the search string by eliminating at least one duplicate term from the search string.

11. The system of claim 4, wherein the search engine generates the plurality of altered versions of the search string by recognizing at least two terms in the search string as a literal phrase to be employed in a respective one of the second queries.

12. The system of claim 4, wherein the search engine generates the plurality of altered versions of the search string by:
- applying a weight to each of a plurality of terms in the search string based upon frequency data; and
- eliminating at least one of the terms having a smallest weight from the search string.

13. The system of claim 4, wherein the search string is overly constrained, thereby resulting in identifying less than the predefined threshold number of items from among the plurality of items in the data store.

14. A method, comprising:
- detecting when a first query generated from a search string in a computing device identifies less than a threshold number of items from among a plurality of items in a data store;
- generating, upon detection, a plurality of altered versions of the search string in the computing device that are restricted to containing a subset of search terms of the search string;
- implementing, in the computing device, a submission of a plurality of second queries to the data store, each of the second queries corresponding to a respective one of the altered versions of the search string; and
- generating, in the computing device, a presentation of at least two separate groups of the items resulting from a corresponding at least two of the second queries to be rendered.

15. The method of claim 14, wherein detecting when the first query generated from the search string in the computing device identifies less than the threshold number of items from among the plurality of items in the data store further comprises detecting when the first query generated from the search string identifies less than one of the items from among the plurality of items.

16. The method of claim 14, further comprising sending the presentation to a client to be rendered by the client.

17. The method of claim 14, further comprising facilitating a selection of one of the at least two separate groups of the items in the presentation to be rendered apart from other groups of the items.

18. The method of claim 14, wherein generating the plurality of altered versions of the search string further comprises removing at least one term from the search string.

19. The method of claim 18, wherein the at least one term is removed from the search string from left to right.

20. The method of claim 14, wherein for each of the at least two separate groups of the items, the method further comprises associating a total number of the items in a respective one of the at least two groups with the presentation of the at least two groups of the items.

21. The method of claim 14, wherein generating the plurality of altered versions of the search string further comprises eliminating at least one duplicate term from the search string.

22. The method of claim 14, wherein generating the plurality of altered versions of the search string further comprises recognizing at least two terms in the search string as a literal phrase to be employed in a respective one of the second queries.

23. The method of claim 14, wherein generating the plurality of altered versions of the search string further comprises:
- applying a weight to each of a plurality of terms in the search string based upon frequency data; and
- eliminating at least one of the terms having a smallest weight from the search string.

24. The method of claim 14, wherein generating the plurality of altered versions of the search string further comprises automatically correcting a spelling of at least one of a plurality of terms in the search string.

25. The method of claim 14, wherein the search string is overly constrained, thereby resulting in identifying less than the threshold number of items from among the plurality of items in the data store.

* * * * *